(12) United States Patent
Ji et al.

(10) Patent No.: US 10,882,941 B2
(45) Date of Patent: Jan. 5, 2021

(54) INITIATOR MIXTURE, COMPOSITION, THE USE THEREOF, POLYOL POLYMER PREPARATION METHOD, AND POLYOL POLYMER OBTAINED BY THE METHOD

(71) Applicant: Arkema France, Colombes (FR)

(72) Inventors: Bin Ji, Jiangsu (CN); Shenglin Zou, Shanghai (CN); Peng Dai, Jiangsu (CN)

(73) Assignee: Arkema France, Colombes (FR)

( * ) Notice: Subject to any disclaimer, the term of this patent is extended or adjusted under 35 U.S.C. 154(b) by 0 days.

(21) Appl. No.: 15/760,261

(22) PCT Filed: Sep. 16, 2016

(86) PCT No.: PCT/FR2016/052357
§ 371 (c)(1),
(2) Date: Mar. 15, 2018

(87) PCT Pub. No.: WO2017/046544
PCT Pub. Date: Mar. 23, 2017

(65) Prior Publication Data
US 2018/0258211 A1    Sep. 13, 2018

(30) Foreign Application Priority Data

Sep. 18, 2015 (FR) ...................... 15 58808

(51) Int. Cl.
| | | |
|---|---|---|
| *C08F 283/06* | (2006.01) | |
| *C08F 2/38* | (2006.01) | |
| *C08F 4/38* | (2006.01) | |

(52) U.S. Cl.
CPC .............. *C08F 283/06* (2013.01); *C08F 2/38* (2013.01); *C08F 4/38* (2013.01)

(58) Field of Classification Search
CPC .................................... C08F 283/06
See application file for complete search history.

(56) References Cited

U.S. PATENT DOCUMENTS

| | | | | | |
|---|---|---|---|---|---|
| 2012/0108758 | A1* | 5/2012 | Laignel | .................. | C08J 3/2053 525/330.3 |
| 2013/0309800 | A1* | 11/2013 | Kunz | .................. | C08K 5/0025 438/64 |
| 2015/0166812 | A1* | 6/2015 | Ito | ...................... | H01L 29/4908 522/39 |

FOREIGN PATENT DOCUMENTS

| | | |
|---|---|---|
| EP | 1 506 240 | 3/2012 |
| WO | WO-00/59971 | 10/2000 |
| WO | WO-03/097710 | 11/2003 |
| WO | WO-2012/104298 | 8/2012 |

OTHER PUBLICATIONS

International Search Report dated Jan. 5, 2017 for PCT/FR2016/052357.

\* cited by examiner

*Primary Examiner* — Catherine S Branch
(74) *Attorney, Agent, or Firm* — NK Patent Law

(57) ABSTRACT

The present invention relates to an initiator mixture, a composition, use thereof, a process of preparing polymer polyol, and a polymer polyol obtained by the process. The initiator mixture comprises: a first peroxide of formula (I) $R_1$—O—O—$R_2$, wherein $R_1$ and $R_2$ are independent an alkyl group or an alkanoyl group comprising 1 to 30 carbon atoms, preferably 3 to 20 carbon atoms, and more preferably 4 to 20 carbon atoms; and a second peroxide of formula (II) $R_3$—O—O—$R_4$—O—O—$R_5$, wherein $R_3$ and $R_5$ are independently an alkyl group comprising 1 to 30 carbon atoms, preferably 3 to 20 carbon atoms, and more preferably 5 to 10 carbon atoms, and $R_4$ is a cycloalkylene group comprising 3 to 30 carbon atoms, preferably 4 to 20 carbon atoms, and more preferably 5 to 10 carbon atoms.

17 Claims, No Drawings

INITIATOR MIXTURE, COMPOSITION, THE USE THEREOF, POLYOL POLYMER PREPARATION METHOD, AND POLYOL POLYMER OBTAINED BY THE METHOD

CROSS-REFERENCE TO RELATED APPLICATIONS

This application is a U.S. National Stage application of International Application No. PCT/FR2016/052357, filed Sep. 16, 2016, which claims the benefit of French Application No. 1558808, filed Sep. 18, 2015.

TECHNICAL FIELD

The present invention relates to an initiator mixture, a composition, a use thereof a process of preparing polymer polyol, and a polymer polyol obtained by the process.

TECHNICAL BACKGROUND

Polymer polyols (POP) are widely used in polyurethane foams, such as pillows, sofa and the like. At present, an azo initiator such as azodiisobutyronitrile (AIBN) is widely used as an initiator for preparing the polymer polyols.

Since the decomposition of the azo initiator is toxic and the dosage of the azo initiator used is high, a peroxide initiator such as t-amyl peroxide has been used to replace the azo initiator. But main problems for the peroxide initiator are that the amount of the residual monomer in the POP is high and that the viscosity of final POP is high.

Thus, there is still a need for peroxide initiator which can reduce the amount of the residual monomer and/or the viscosity of final POP.

SUMMARY OF THE INVENTION

It is a first object of the invention to provide an initiator mixture comprising a first peroxide of formula (I) and a second peroxide of formula (II):

$$R_1\text{—O—O—}R_2, \qquad (I)$$

wherein $R_1$ and $R_2$ are independent an alkyl group or an alkanoyl group comprising 1 to 30 carbon atoms, preferably 3 to 20 carbon atoms, and more preferably 4 to 20 carbon atoms, $$R_3\text{—O—O—}R_4\text{—O—O—}R_5, \qquad (II)$$

wherein $R_3$ and $R_5$ are independently an alkyl group comprising 1 to 30 carbon atoms, preferably 3 to 20 carbon atoms, and more preferably 5 to 10 carbon atoms, and $R_4$ is a cycloalkylene group comprising 3 to 30 carbon atoms, preferably 4 to 20 carbon atoms, and more preferably 5 to 10 carbon atoms.

According to one embodiment, at least one of $R_1$ and $R_2$ is an alkanoyl group.

According to one embodiment, at least one of $R_1$ and $R_2$ is a t-amyl group.

According to one embodiment, at least one of $R_1$ is an alkanoyl group and $R_2$ is a t-amyl group.

According to one embodiment, $R_1$ is selected from the group consisting of formacyl, acetyl, propionyl, butyryl, valeryl, pivaloyl, caproyl, enanthyl, capryloyl, 2-ethylcaproyl, nonanoyl, decanoyl, undecanoyl, dodecanoyl, tridecanoyl, tetradecanoyl, hexadecanoyl, octadecanoyl, and eicosanoyl.

According to one embodiment, $R_2$, $R_3$ and $R_5$ are independently a tert-alkyl group comprising 4 to 30 carbon atoms, preferably 4 to 20 carbon atoms, and more preferably 5 to 10 carbon atoms, and in particular independently selected from the group consisting of t-butyl, t-amyl, t-hexyl, t-heptyl, t-octyl, t-nonyl, and t-decyl.

According to one embodiment, $R_4$ is a 1,1-cycloalkylene group, and preferably selected from the group consisting of cyclopropylene, cyclobutylene, cyclopentylene, cyclohexylene, cycloheptylene, cyclooctylene, cyclononylene, and cyclodecylene.

All embodiments for $R_1$, $R_2$, $R_3$, $R_4$ and $R_5$ are possible in combination for formulas (I) and (II).

According to one embodiment, the first peroxide of formula (I) is t-amyl peroxy-2-ethylhexanoate, tertio-amyl peroxypivalate, tertio-butyl peroxy-2-ethylhexanoate, or tertio-amyl peroxyneodecanoate.

According to one embodiment, the second peroxide of formula (II) is 1,1-di(t-amylperoxy)-cyclohexane, 1,1-di(tertio-butylperoxy)-3,3,5-trimethylcyclohexane, or 1,1-di(tertio-butylperoxy)-cyclohexane.

According to one embodiment, the initiator mixture comprises 50 to 90 wt %, preferably 70 to 90 wt % of the first peroxide of formula (I) and 10 to 50 wt %, preferably 10 to 30 wt % of the second peroxide of formula (II), based on the total weight of the initiator mixture.

According to one embodiment, the initiator mixture further comprises a third peroxide of formula (III):

$$R_6\text{—O—O—C(=O)—O—}R_7, \qquad (III)$$

wherein $R_6$ and $R_7$ are independent an alkyl group comprising 1 to 30 carbon atoms, preferably 3 to 20 carbon atoms, and more preferably 5 to 10 carbon atoms.

According to one embodiment, $R_6$ is a tert-alkyl group comprising 4 to 30 carbon atoms, preferably 4 to 20 carbon atoms, and more preferably 5 to 10 carbon atoms, and in particular selected from the group consisting of t-butyl, t-amyl, t-hexyl, t-heptyl, t-octyl, t-nonyl, and t-decyl.

According to one embodiment, $R_7$ is selected from the group consisting of methyl, ethyl, propyl, butyl, amyl, hexyl, heptyl, octyl, 2-ethylhexyl, nonyl, decyl, undecyl, dodecyl, tridecyl, tetradecyl, cetyl, octadecyl, and eicosyl.

Possible $R_6$ and $R_7$ given above are present on formula (III).

According to one embodiment, the third peroxide of formula (III) is OO-t-amyl-O-(2-ethylhexyl)-monoperoxycarbonate, or OO-t-butyl-O-(2-ethylhexyl)-monoperoxycarbonate.

According to one embodiment, the initiator mixture comprises 50 to 90 wt %, preferably 70 to 90 wt % of the first peroxide of formula (I), 10 to 50 wt %, preferably 10 to 30 wt % of the second peroxide of formula (II), and greater than 0 and equal to or less than 30 wt %, preferably 10-20 wt % of the third peroxide of formula (III), based on the total weight of the initiator mixture.

It is a second object of the invention to provide a composition comprising the initiator mixture according to the present invention and a thiol-based chain transfer agent.

According to one embodiment, the thiol-based chain transfer agent is a chain transfer agent of formula (IV):

$$\text{SH—}R_8\text{—C(=O)—O—}R_9 \qquad (IV)$$

wherein $R_8$ is an alkylene group comprising 1 to 30 carbon atoms, preferably 3 to 20 carbon atoms, and more preferably 5 to 10 carbon atoms, and $R_9$ is an alkyl group comprising 1 to 30 carbon atoms, preferably 3 to 20 carbon atoms, and more preferably 5 to 10 carbon atoms.

According to one embodiment, $R_8$ is selected from the group consisting of methylene, ethylene, propylene, butylene, pentylene, hexylene, heptylene, octylene, nonylene, and decylene.

According to one embodiment, $R_9$ is selected from the group consisting of methyl, ethyl, propyl, butyl, amyl, hexyl, heptyl, octyl, 2-ethylhexyl, nonyl, decyl, undecyl, dodecyl, tridecyl, tetradecyl, cetyl, octadecyl, and eicosyl.

Possible $R_8$ and $R_9$ given above are present on formula (IV).

According to one embodiment, the chain transfer agent of formula (IV) is 2-ethylhexyl thioglycolate.

According to one embodiment, the composition comprises 30 to 70 wt %, preferably 40 to 60 wt % of the initiator mixture and 30 to 70 wt %, preferably 40 to 60 wt % of the thiol-based chain transfer agent, based on the total weight of the composition.

It is a third object of the invention to provide a process of preparing a polymer polyol, comprising: using the initiator mixture according to the present invention or the composition according to the invention as an initiator.

According to one embodiment, the process comprises polymerizing a reaction mixture comprising a polyol, an ethylenically unsaturated monomer, and a macromonomer in the presence of the initiator mixture or the composition.

According to one embodiment, the amount of the initiator mixture or the composition is 0.1 to 0.8 wt % based on the weight of the reaction mixture.

It is a fourth object of the invention to provide use of the initiator mixture according to the present invention or the composition according to the invention for preparing a polymer polyol.

It is a fifth object of the invention to provide a polymer polyol obtained by the process according to the present invention.

The present invention makes it possible to overcome one or more of the drawbacks of the prior art. In particular, the invention can reduce the amount of the residual monomer and/or the viscosity of the polymer polyol.

The invention relies on the finding that the combination of the first peroxide of formula (I) and the second peroxide of formula (II) can achieve a synergistic effect in terms of reducing the amount of the residual monomer, as compared to the first peroxide of formula (I) or the second peroxide of formula (II) alone.

Further, in the present invention, by further adding the thiol-based chain transfer agent, in particular the chain transfer agent of formula (IV), the dosage of the peroxide initiator can be lowered and also the viscosity of final polymer polyol can be decreased.

DESCRIPTION OF EMBODIMENTS

The invention will now be described in more detail without limitation in the following description. Unless specified otherwise, all concentrations and ratios are expressed by weight.

The invention is directed to an initiator mixture, a composition comprising the initiator mixture, a use thereof, a process for preparation of a polymer polyol, and a polymer polyol obtained by the process.

In the first aspect, the initiator mixture of the present invention comprises a first peroxide of formula (I) and a second peroxide of formula (II):

$$R_1-O-O-R_2, \qquad (I)$$

wherein $R_1$ and $R_2$ are independent an alkyl group or an alkanoyl group comprising 1 to 30 carbon atoms, preferably 3 to 20 carbon atoms, and more preferably 4 to 20 carbon atoms, $$R_3-O-O-R_4-O-O-R_5, \qquad (II)$$

wherein $R_3$ and $R_5$ are independently an alkyl group comprising 1 to 30 carbon atoms, preferably 3 to 20 carbon atoms, and more preferably 5 to 10 carbon atoms, and $R_4$ is a cycloalkylene group comprising 3 to 30 carbon atoms, preferably 4 to 20 carbon atoms, and more preferably 5 to 10 carbon atoms.

$R_1$, $R_2$, $R_3$ and $R_5$ each can be linear or branched. $R_1$, $R_2$, $R_3$, $R_4$ and $R_5$ each can be substituted or non-substituted, and substituents may include halogen (e.g., F, Cl, Br, or I), alkyl (e.g., C1 to C10), alkoxy (e.g., C1 to C10), and the like. According to one embodiment, $R_1$, $R_2$, $R_3$ and $R_5$ each can be a non-substituted linear or branched alkyl group, and $R_4$ can be anon-substituted cycloalkylene group.

At least one of $R_1$ and $R_2$ is an alkanoyl group. Moreover, at least one of $R_1$ and $R_2$ is a t-amyl group.

$R_1$ can be selected from the group consisting of formacyl, acetyl, propionyl, butyryl, valeryl, pivaloyl, caproyl, enanthyl, capryloyl, 2-ethylcaproyl, nonanoyl, decanoyl, undecanoyl, dodecanoyl, tridecanoyl, tetradecanoyl, hexadecanoyl, octadecanoyl, and eicosanoyl.

$R_2$, $R_3$ and $R_5$ each can independently a tert-alkyl group comprising 4 to 30 carbon atoms, preferably 4 to 20 carbon atoms, and more preferably 5 to 10 carbon atoms, and in particular independently selected from the group consisting of t-butyl, t-amyl, t-hexyl, t-heptyl, t-octyl, t-nonyl, and t-decyl.

$R_4$ can be a 1,1-cycloalkylene group, and preferably selected from the group consisting of cyclopropylene, cyclobutylene, cyclopentylene, cyclohexylene, cycloheptylene, cyclooctylene, cyclononylene, and cyclodecylene.

Preferred examples of the first peroxide of formula (I) include t-amyl peroxy-2-ethylhexanoate (for example marketed by Arkema under the name Luperox® 575), tertio-amyl peroxypivalate, tertio-butyl peroxy-2-ethylhexanoate, or tertio-amyl peroxyneodecanoate.

Preferred examples of the second peroxide of formula (II) include 1,1-di(t-amylperoxy)-cyclohexane, 1,1-di(tertio-butylperoxy)-3,3,5-trimethylcyclohexane, or 1,1-di(tertio-butylperoxy)-cyclohexane (for example marketed by Arkema under the name Luperox® 531M80, Luperox® 331, Luperox® 231).

The amount of the first peroxide of formula (I) is 50 to 90 wt %, for example 70 to 90 wt % or 60 to 80 wt %, and preferably 80 wt %, and the amount of the second peroxide of formula (II) is 10 to 50 wt %, for example 10 to 30 wt % or 20-40 wt %, and preferably 20 wt %, based on the total weight of the initiator mixture.

In one embodiment, the initiator mixture of the present invention can be consisted of the first peroxide of formula (I) and the second peroxide of formula (II).

In another embodiment, the initiator mixture of the present invention may further comprise a third peroxide of formula (III):

$$R_6-O-O-C(=O)-O-R_7, \qquad (III)$$

wherein $R_6$ and $R_7$ are independent an alkyl group comprising 1 to 30 carbon atoms, preferably 3 to 20 carbon atoms, and more preferably 5 to 10 carbon atoms.

$R_6$ and $R_7$ each can be linear or branched, and can be substituted or non-substituted. Substituents may include halogen (e.g., F, Cl, Br, or I), alkyl (e.g., C1 to C10), alkoxy (e.g., C1 to C10), and the like. According to one embodiment, $R_6$ and $R_7$ each can be a non-substituted linear or branched alkyl group.

$R_6$ can be a tert-alkyl group comprising 4 to 30 carbon atoms, preferably 4 to 20 carbon atoms, and more preferably 5 to 10 carbon atoms, and in particular selected from the group consisting of t-butyl, t-amyl, t-hexyl, t-heptyl, t-octyl, t-nonyl, and t-decyl.

$R_7$ can be selected from the group consisting of methyl, ethyl, propyl, butyl, amyl, hexyl, heptyl, octyl, 2-ethylhexyl, nonyl, decyl, undecyl, dodecyl, tridecyl, tetradecyl, cetyl, octadecyl, and eicosyl.

Preferred examples of the third peroxide of formula (III) include OO-t-amyl-O-(2-ethylhexyl)-monoperoxycarbonate or OO-t-butyl-O-(2-ethylhexyl)-monoperoxycarbonate (for example marketed by Arkema under the name Luperox® TAEC, Luperox® TBEC).

In the case of the initiator mixture further comprising the third peroxide, the amount of the first peroxide of formula (I) is 50 to 90 wt %, for example 70 to 90 wt % or 60 to 80 wt %, and preferably 80 wt %, the amount of the second peroxide of formula (II) is 10 to 50 wt %, for example 10 to 30 wt % or 20-40 wt %, and preferably 10 wt %, and the amount of the third peroxide of formula (III) is greater than 0 and equal to or less than 30 wt %, for example 10-20 wt %, and preferably 10 wt %, based on the total weight of the initiator mixture.

In the second aspect, the composition according to the present invention comprises the initiator mixture as described above and a thiol-based chain transfer agent.

Preferably, the thiol-based chain transfer agent can be a chain transfer agent of formula (IV):

$$SH—R_8—C(=O)—O—R_9, \quad (IV)$$

wherein $R_8$ is an alkylene group comprising 1 to 30 carbon atoms, preferably 3 to 20 carbon atoms, and more preferably 5 to 10 carbon atoms, and $R_9$ is an alkyl group comprising 1 to 30 carbon atoms, preferably 3 to 20 carbon atoms, and more preferably 5 to 10 carbon atoms.

$R_8$ and $R_9$ each can be linear or branched, and can be substituted or non-substituted. Substituents may include halogen (e.g., F, Cl, Br, or I), alkyl (e.g., C1 to C10), alkoxy (e.g., C1 to C10), and the like. According to one embodiment, $R_8$ can be a non-substituted linear or branched alkylene group, and $R_9$ can be a non-substituted linear or branched alkyl group.

$R_8$ can be selected from the group consisting of methylene, ethylene, propylene, butylene, pentylene, hexylene, heptylene, octylene, nonylene, and decylene.

$R_9$ can be selected from the group consisting of methyl, ethyl, propyl, butyl, amyl, hexyl, heptyl, octyl, 2-ethylhexyl, nonyl, decyl, undecyl, dodecyl, tridecyl, tetradecyl, cetyl, octadecyl, and eicosyl.

Preferred examples of the chain transfer agent of formula (IV) include 2-ethylhexyl thioglycolate (for example marketed by Arkema under the name HEMA).

The amount of the initiator mixture is 30 to 70 wt %, for example 40 to 60 wt %, and preferably 50 wt %, and the amount of the thiol-based chain transfer agent is 30 to 70 wt %, for example 40 to 60 wt %, and preferably 50 wt %, based on the total weight of the composition.

The above thiol-based chain transfer agent, in particular the chain transfer agent of formula (IV) is useful for decreasing the viscosity of final polymer polyol. By further using the thiol-based chain transfer agent, the dosage of the peroxide initiator can be lowered and also the viscosity of final product can be decreased.

In the third aspect of the invention, the process of preparing the polymer polyol comprises using the initiator mixture or the composition described above as an initiator.

In particular, the process comprises polymerizing a reaction mixture comprising a polyol, an ethylenically unsaturated monomer, and a macromonomer in the presence of the initiator mixture or the composition.

The polyol used in the present invention can be any polyol available in the art. For example, the polyol includes polyether polyol, polyester polyol and the like. The preferred polyol is polyalkylene oxide polyether polyol such as poly(oxypropylene) and/or poly(oxypropylene-oxyethylene)glycols, triols, and higher functionality polyols. The number average molecular weight of the polyol is not particularly limited, but can be about 400 or greater, preferably about 1000 or greater, for example about 400 to about 12000, preferably about 2000 to about 8000.

The ethylenically unsaturated monomer used in the present invention can be any ethylenically unsaturated monomer available in the art. The suitable ethylenically unsaturated monomer includes (i) vinyl aromatic monomers such as styrene and the like, (ii) acrylic monomer such as acrylates and methyacrylates, and (iii) ethylenically unsaturated nitriles and amides such as acrylonitrile, methyacrylonitrile and the like. The preferred ethylenically unsaturated monomer is styrene and/or acrylonitrile. When styrene and acrylonitrile are employed, the amount of styrene can range from about 10% to about 85%, preferably from about 40% to about 75%, and more preferably from about 50% to about 70%, relative to the weight of acrylonitrile.

The ratio between the polyol and the ethylenically unsaturated monomer in the present invention is not particularly limited, but can be 40-90: 10-60 and preferably 60-80: 20-40.

The macromonomer used in the present invention can be any macromonomer available in the art. For example: the macromonomer can be synthesized by polyol with maleic anhydride at elevated temperature with appropriate catalyst.

The amount of the macromonomer is not particularly limited, but can be 2-5% weight, based on the weight of the reaction mixture consisting of the polyol, the ethylenically unsaturated monomer, and the macromonmer.

The reaction mixture can also comprise various additives known in the art, for example, inhibitors such as Irganox 1076.

The amount of the initiator mixture or the composition used in the present invention is not particularly limited, but can be 0.1 to 0.8 wt % based on the weight of the reaction mixture consisting of the polyol, the ethylenically unsaturated monomer, and the macromonmer.

In one embodiment, the polymerization of the reaction mixture can be performed in one reactor, and the initiator mixture or the composition can be added into the reactor simultaneously.

Alternatively, in another embodiment, the polymerization of the reaction mixture can be performed in two reactors, and at least one of the components of the initiator mixture or the composition can be added into the first reactor, while the other component(s) can be added into the second reactor. For example, the first peroxide can be added into the first reactor, while the second peroxide and the third peroxide and the thiol-based chain transfer agent (if present) can be added into the second reactor.

The polymerization can be carried out at a temperature of at least 90° C., preferably 100° C. to 140° C., and more preferably 120 to 135° C.

In addition, the polymerization can be carried out in a solvent. The solvent used in the present invention can be any solvent available in the art. For example, the solvent can be selected from benzene, toluene, xylene, ethyl benzene, hexane, isopropanol, n-butanol, 2-butanol, ethyl acetate, butyl acetate, and mixtures thereof.

In the fourth aspect of the present invention, the present invention relates to use of the initiator mixture according to the present invention or the composition according to the invention for preparing the polymer polyol.

In the fifth aspect of the present invention, the polymer polyol obtained by the process can have improved properties, such as reduced residual monomer level and/or reduced viscosity.

EXAMPLES

The following examples illustrate the invention without limiting it.

Example 1

120 g of polyether polyol (PPG) (the polyether polyol is synthesized by ethylene oxide and propylene oxide using glycerol as initiator, has an OH value of around 56 and a molecular weight of around 3000, and is hydroxyl terminated. was firstly added into a three neck glass reactor (2 L) equipped with a stirrer, a condenser and a thermal meter, and then was increased to 130° C. by electric heating jacket. 240.2 g of the PPG 216 g of styrene, 96 g of acrylonitrile, 20.8 g of macromonomer (the macromonomer is synthesized by copolymerization of poly ether, maleic anhydride and ethylene oxide, and has an OH value of around 35, 56 g of isopropanol, and 1.733 g of a mixture of 80 wt % of Luperox® 575 and 20 wt % of Luperox® 531M80 as an initiator (0.25% based on the total weight of the reaction mixture (which excludes isopropanol)) were mixed and added into the reactor in 1 hour by a metering pump. After the addition was complete, the reactor was is increased to and kept at 135° C. for another 1 hour. Then, the unreacted monomers and the isopropanol were removed by vacuum for 1 hour to obtain a polymer polyol as the final product.

Example 2

The polymer polyol was obtained as in Example 1, except that 1.733 g of a mixture of 80 wt % of Luperox® 575, 10 wt % of Luperox® 531M80 and 10 wt % of Luperox® TAEC was used as the initiator.

Comparative Example 1

The polymer polyol was obtained as in Example 1, except that 2.77 g of AIBN was used as the initiator (0.4% based on the total weight of the reaction mixture).

Comparative Example 2

The polymer polyol was obtained as in Example 1, except that 1.733 g of Luperox® 575 was used as the initiator.

Comparative Example 3

The polymer polyol was obtained as in Example 1, except that 1.733 g of Luperox® 531M80 was used as the initiator.

Viscosities, amounts of the residual monomer (styrene), and solid contents of the polymer polyols obtained in Examples 1-2 and Comparative Examples 1-3 were measured. The viscosity was determined by a Brookfield viscometer at 25° C. The amount of the residual monomer (styrene) was analyzed by gas chromatography (GC) using Agilent 7890B with headspace.

The solid content is tested by the following method. Some sample of final POP product are accurately prepared and weighted (the mass being M1 (0.1 mg)), and then is dissolved in ethanol for a while. After that, a high speed centrifuge is used to separate PPG and copolymer (including styrene-acrylonitrile (SAN) and Grafted SAN). The process is repeated three times and a vacuum oven is used to remove left ethanol at 80° C. The final solid left in the centrifuge tube is weighted, and the mass is M2. Solid content=M2/M1*100%.

The results were listed in Table 1 below.

TABLE 1

| | Example 1 | Example 2 | Comparative Example 1 | Comparative Example 2 | Comparative Example 3 |
|---|---|---|---|---|---|
| Initiator | 80 wt % 575 + 20 wt % 531M80 (0.25%) | 80 wt % 575 + 10 wt % 531M80 + 10 wt % TAEC (0.25%) | AIBN (0.4%) | 575 (0.25%) | 531M80 (0.25%) |
| Solid content, % | 44.78 | 44.80 | 44.14 | 43.72 | 42.15 |
| Particle Size, μm | 1.01 | 1.01 | 1.01 | 1.02 | 1.02 |
| Viscosity, cps | 7200 | 6800 | 6500 | 7000 | 12000 |
| Residual monomer, ppm (styrene) | 6324 | 5200 | 9846 | 13258 | 23221 |

It can been from the above results that as compared to Comparative Example 1 which uses 0.4% of AIBN as the initiator, Examples 1 and 2 which use the combination of Luperox® 575 and Luperox® 531M80 in the initiator would lower amount of the residual monomer under lower dosage (0.25%). Moreover, under the same dosage, Examples 1 and 2 which use the combination of Luperox® 575 and Luperox® 531M80 in the initiator would achieve lower amount of the residual monomer as compared to Comparative Examples 2 and 3 which uses Luperox® 575 and Luperox® 531M80 alone, respectively. This demonstrates that the combination of the first peroxide (in particular, Luperox® 575) and the second peroxide (in particular, Luperox® 531M80) achieves a synergistic effect in terms of reducing the amount of the residual monomer.

Example 3

The polymer polyol was obtained as in Example 1, except that 1.274 g of a mixture of 72 wt % of Luperox® 575, 18 wt % of Luperox® 531M80 and 10 wt % of Luperox® TAEC was used as the initiator (0.18% based on the total weight of the reaction mixture) and 1.274 g of 2-ethylhexyl thioglycolate was further mixed as a thiol-based chain transfer agent.

Example 4

The polymer polyol was obtained as in Example 1, except that 1.386 g of a mixture of 80 wt % of Luperox® 575 and 20 wt % of Luperox® 531M80 was used as the initiator (0.18% based on the total weight of the reaction mixture) and 1.386 g of 2-ethylhexyl thioglycolate (EHTG) was further mixed as a thiol-based chain transfer agent.

Comparative Example 4

The polymer polyol was obtained as in Example 1, except that 4.16 g of AIBN was used as the initiator (0.6% based on the total weight of the reaction mixture).

Viscosities, amounts of the residual monomer (styrene), and solid contents of the polymer polyols obtained in Examples 3-4 were measured as above, and the results were listed in Tables 2 and 3 below.

TABLE 2

|  | Example 3 | Comparative Example 1 | Comparative Example 2 | Comparative Example 3 |
| --- | --- | --- | --- | --- |
| Initiator | 72 wt % 575 + 18 wt % 531M80 + 10 wt % TAEC (0.18%) | AIBN (0.4%) | 575 (0.25%) | 531M80 (0.25%) |
| Thiol-based chain transfer agent | EHTG (0.18%) | — | — | — |
| Solid content, % | 44.70 | 44.14 | 43.72 | 42.15 |
| Particle Size, μm | 1.160 | 1.01 | 1.02 | 1.02 |
| Viscosity, cps | 4500 | 6500 | 7000 | 12000 |
| Residual monomer, ppm (styrene) | 5700 | 9846 | 13258 | 23221 |

TABLE 3

|  | Example 4 | Comparative Example 4 |
| --- | --- | --- |
| Initiator | 80 wt % 575 + 20 wt % 531M80 (0.2%) | AIBN (0.6%) |
| Thiol-based chain transfer agent | EHTG (0.2%) | — |
| Particle Size, μm | 1.238 | 1.067 |

TABLE 3-continued

|  | Example 4 | Comparative Example 4 |
| --- | --- | --- |
| Viscosity, cps | 5200 | 7400 |
| Residual monomer, ppm (styrene) | 6300 | 9800 |

It can be seen from the above results that under the circumstance that the thiol-based chain transfer agent of EHTG is further added in addition to the combination of Luperox® 575 and Luperox® 531M80, the viscosity is decreased while the amount of the residual monomer is decreased.

Example 5

104.5 g of polyether polyol (PPG as defined in example 1) was firstly added into a three neck glass reactor (2 L) equipped with a stirrer, a condenser and a thermal meter, and then was increased to 130° C. by electric heating jacket. 203 g of the PPG 184.9 g of styrene, 79.7 g of acrylonitrile, 27.1 g of macromonomer (as defined in example 1), 48 g of isopropanol, and 1.348 g of a mixture of 80 wt % of Luperox® 575 and 20 wt % of Luperox® 531M80 as an initiator (0.225% based on the total weight of the reaction mixture) were mixed and added into the reactor in 1 hour by a metering pump. After the addition was complete, the reactor was is increased to and kept at 130° C. for another 1 hour. Then, the unreacted monomers and the isopropanol were removed by vacuum for 1 hour to obtain a polymer polyol as the final product.

Example 6

The polymer polyol was obtained as in Example 5, except that 1.348 g of a mixture of 25 wt % of Luperox® 575 and of 75 wt % of Luperox® 531M80 was used as the initiator.

Example 7

The polymer polyol was obtained as in Example 5, except that 1.348 g of a mixture of 50 wt % of Luperox® 575 and of 50 wt % of Luperox® 531M80 was used as the initiator.

TABLE 4

|  | Example 5 | Example 6 | Example 7 |
|---|---|---|---|
| Initiator | 80% en poids 575 + 20% en poids 531M80 (0.225%) | 25% en poids 575 + 75% en poids 531M80 (0.225%) | 50% en poids 575 + 50% en poids 531M80 (0.225%) |
| Particule size | No big particules | Presence of big particules | Presence of big particules |
| Viscosity, cps | 5600 | 7800 | 8700 |

It can been from the above results that as compared to Examples 6 and 7 which use as initiator a combination of 25 wt % of Luperox® 575 and of 75 wt % of Luperox® 531M80 and a combination of 50 wt % of Luperox® 575 and of 50 wt % of Luperox® 531M80 respectively, the example 5 which uses a combination of 80 wt % of Luperox® 575 and of 20 wt % of Luperox® 531M80 permits to reduce the amount of the residual monomer and to obtained a lower viscosity.

The invention claimed is:

1. An initiator mixture comprising a first peroxide of formula (I) and a second peroxide of formula (II):

$$R_1\text{—}O\text{—}O\text{—}R_2, \quad (I)$$

wherein $R_1$ and $R_2$ are independently an alkyl group or an alkanoyl group comprising 1 to 30 carbon atoms, and $$R_3\text{—}O\text{—}O\text{—}R_4\text{—}O\text{—}O\text{—}R_5, \quad (II)$$

wherein $R_3$ and $R_5$ are independently an alkyl group comprising 1 to 30 carbon atoms, and $R_4$ is a cycloalkylene group comprising 3 to 30 carbon atoms, wherein the initiator mixture comprises 70 to 90 wt % of the first peroxide of formula (I) and 10 to 30 wt % of the second peroxide of formula (II), based on the total weight of the initiator mixture.

2. The initiator mixture according to claim 1, wherein at least one of $R_1$ and $R_2$ is an alkanoyl group.

3. The initiator mixture according to claim 1, wherein at least one of $R_1$ and $R_2$ is a t-amyl group.

4. The initiator mixture according to claim 1, wherein at least one of $R_1$ is an alkanoyl group and $R_2$ is a t-amyl group.

5. The initiator mixture according to claim 1, wherein $R_1$ is selected from the group consisting of formacyl, acetyl, propionyl, butyryl, valeryl, pivaloyl, caproyl, enanthyl, capryloyl, 2-ethylcaproyl, nonanoyl, decanoyl, undecanoyl, dodecanoyl, tridecanoyl, tetradecanoyl, hexadecanoyl, octadecanoyl, and eicosanoyl,
wherein $R_2$, $R_3$ and $R_5$ are independently a tert-alkyl group comprising 4 to 30 carbon atoms, and
wherein $R_4$ is a 1,1-cycloalkylene group.

6. The initiator mixture according to claim 1, wherein the first peroxide of formula (I) comprises t-amyl peroxy-2-ethylhexanoate, tertio-amyl peroxypivalate, tertio-butyl peroxy-2-ethylhexanoate, or tertio-amyl peroxyneodecanoate, and/or the second peroxide of formula (II) comprises 1,1-di(t-amylperoxy)-cyclohexane, 1,1-di(tertio-butylperoxy)-3,3,5-trimethylcyclohexane, or 1,1-di(tertio-butylperoxy)-cyclohexane.

7. An initiator mixture comprising a first peroxide of formula (I), a second peroxide of formula (II), and a third peroxide of formula (III):

$$R_1\text{—}O\text{—}O\text{—}R_2, \quad (I)$$

wherein $R_1$ and $R_2$ are independently an alkyl group or an alkanoyl group comprising 1 to 30 carbon atoms, and $$R_3\text{—}O\text{—}O\text{—}R_4\text{—}O\text{—}O\text{—}R_5, \quad (II)$$

wherein $R_3$ and $R_5$ are independently an alkyl group comprising 1 to 30 carbon atoms, and $R_4$ is a cycloalkylene group comprising 3 to 30 carbon atoms, $$R_6\text{—}O\text{—}O\text{—}C(=O)\text{—}O\text{—}R_7, \quad (III)$$

wherein $R_6$ and $R_7$ are independently an alkyl group comprising 1 to 30 carbon atoms.

8. The initiator mixture according to claim 7, wherein $R_6$ is a tert-alkyl group comprising 4 to 30 carbon atoms, and wherein $R_7$ is selected from the group consisting of methyl, ethyl, propyl, butyl, amyl, hexyl, heptyl, octyl, 2-ethylhexyl, nonyl, decyl, undecyl, dodecyl, tridecyl, tetradecyl, cetyl, octadecyl, and eicosyl.

9. The initiator mixture according to claim 7, wherein the third peroxide of formula (III) comprises OO-t-amyl-O-(2-ethylhexyl)-monoperoxycarbonate or OO-t-butyl-O-(2-ethylhexyl)-monoperoxycarbonate.

10. The initiator mixture according to claim 7, wherein the initiator mixture comprises 50 to 90 wt % of the first peroxide of formula (I), 10 to 50 wt % of the second peroxide of formula (II), and greater than 0 and equal to or less than 30 wt % of the third peroxide of formula (III), based on the total weight of the initiator mixture.

11. A composition comprising the initiator mixture of claim 1 and a thiol-based chain transfer agent.

12. The composition of claim 11, wherein the thiol-based chain transfer agent comprises a chain transfer agent of formula (IV):

$$SH\text{—}R_8\text{—}C(=O)\text{—}O\text{—}R_9, \quad (IV)$$

wherein $R_8$ is an alkylene group comprising 1 to 30 carbon atoms and $R_9$ is an alkyl group comprising 1 to 30 carbon atoms.

13. The composition according to claim 12, wherein $R_8$ is selected from the group consisting of methylene, ethylene, propylene, butylene, pentylene, hexylene, heptylene, octylene, nonylene, and decylene, and wherein $R_9$ is selected from the group consisting of methyl, ethyl, propyl, butyl, amyl, hexyl, heptyl, octyl, 2-ethylhexyl, nonyl, decyl, undecyl, dodecyl, tridecyl, tetradecyl, cetyl, octadecyl, and eicosyl.

14. The composition according to claim 12, wherein the chain transfer agent of formula (IV) is 2-ethylhexyl thioglycolate.

15. The composition according to claim 11, wherein the composition comprises 30 to 70 wt % of the initiator mixture and 30 to 70 wt % of the thiol-based chain transfer agent, based on the total weight of the composition.

16. A process of preparing a polymer polyol comprising polymerizing a reaction mixture comprising a polyol, an ethylenically unsaturated monomer, and optionally a macromonomer, in the presence of the initiator mixture of claim 1.

17. The process according to claim 16, wherein the amount of the initiator mixture is 0.1 to 0.8 wt % based on the weight of the reaction mixture.

* * * * *